(12) United States Patent
Soma' et al.

(10) Patent No.: US 9,248,731 B2
(45) Date of Patent: Feb. 2, 2016

(54) ELECTROHYDRAULIC HYBRID WORK VEHICLE

(71) Applicant: MERLO PROJECT S.r.l. CON UNICO SOCIO, Cervasca (IT)

(72) Inventors: Aurelio Soma', Cervasca (IT); Renato Galfre', Borgo San Dalmazzo (IT); Amilcare Merlo, Cuneo (IT)

(73) Assignee: MERLO PROJECT S.R.L. CON UNICO SOCIO, Cervasca (IT)

( * ) Notice: Subject to any disclaimer, the term of this patent is extended or adjusted under 35 U.S.C. 154(b) by 0 days.

(21) Appl. No.: 14/351,868

(22) PCT Filed: Oct. 15, 2012

(86) PCT No.: PCT/IB2012/055608
§ 371 (c)(1),
(2) Date: Apr. 14, 2014

(87) PCT Pub. No.: WO2013/054316
PCT Pub. Date: Apr. 18, 2013

(65) Prior Publication Data
US 2014/0332294 A1    Nov. 13, 2014

(30) Foreign Application Priority Data
Oct. 14, 2011    (IT) .............................. TO2011A0924

(51) Int. Cl.
| | | |
|---|---|---|
| *B60K 6/26* | (2007.10) | |
| *B60K 6/46* | (2007.10) | |
| *E02F 9/20* | (2006.01) | |
| *B60K 25/00* | (2006.01) | |
| *B60W 10/30* | (2006.01) | |
| *B60W 20/00* | (2006.01) | |
| *H02K 11/00* | (2006.01) | |
| *B66F 9/065* | (2006.01) | |
| *B60K 1/00* | (2006.01) | |
| *B60K 25/02* | (2006.01) | |

(52) U.S. Cl.
CPC ... *B60K 6/46* (2013.01); *B60K 6/26* (2013.01); *B60K 25/00* (2013.01); *B60W 10/30* (2013.01); *B60W 20/00* (2013.01); *B66F 9/0655* (2013.01); *E02F 9/2075* (2013.01); *H02K 11/0073* (2013.01); *B60K 2001/003* (2013.01); *B60K 2025/005* (2013.01); *B60K 2025/022* (2013.01); *B60Y 2200/64* (2013.01); *B60Y 2400/61* (2013.01); *B60Y 2410/115* (2013.01); *Y02T 10/6217* (2013.01); *Y10S 903/903* (2013.01)

(58) Field of Classification Search
CPC ............ B60K 6/46; B60K 6/48; B60K 6/485; B60K 6/20; B60K 6/26; B60K 1/02; B60K 2001/03; E02F 9/2075; E02F 9/2217; B60W 20/00; B60W 10/08; B60W 10/30; B60W 2300/17; B60L 2200/40; B60L 2210/40
See application file for complete search history.

(56) References Cited

U.S. PATENT DOCUMENTS 7,030,520 B2 *   4/2006   Takenaka et al. ............... 310/64
7,102,260 B2 *   9/2006   Takenaka et al. ............... 310/64
7,208,918 B2 *   4/2007   Shirakawa et al. ............. 322/99

(Continued)

*Primary Examiner* — Katy M Ebner
*Assistant Examiner* — Emma K Frick
(74) *Attorney, Agent, or Firm* — Matthew A. Pequignot; Pequignot + Myers (57) ABSTRACT

A hybrid work vehicle having a direct-current electric power bus for connecting at least an electric power controller, an electric machine for driving the vehicle, a reversible electric machine, and a battery.

18 Claims, 5 Drawing Sheets

(56) References Cited

U.S. PATENT DOCUMENTS

| | | | |
|---|---|---|---|
| 7,487,023 B2* | 2/2009 | Komiyama et al. | 701/50 |
| 7,525,224 B2* | 4/2009 | Takenaka et al. | 310/54 |
| 7,610,973 B2* | 11/2009 | Asao et al. | 180/65.21 |
| 7,745,947 B2* | 6/2010 | Komiyama et al. | 290/40 C |
| 7,950,481 B2* | 5/2011 | Betz et al. | 180/65.31 |
| 7,980,073 B2* | 7/2011 | Jensen | 60/414 |
| 8,221,284 B2* | 7/2012 | Asao et al. | 477/5 |
| 8,798,875 B2* | 8/2014 | Yanagisawa et al. | 701/50 |
| 8,798,876 B2* | 8/2014 | Yanagisawa | 701/50 |
| 8,909,434 B2* | 12/2014 | Anders et al. | 701/50 |
| 8,978,800 B2* | 3/2015 | Soma' et al. | 180/65.22 |
| 9,000,716 B2* | 4/2015 | Kanbayashi et al. | 320/104 |
| 2005/0036894 A1* | 2/2005 | Oguri | 417/212 |
| 2008/0082240 A1* | 4/2008 | Kagoshima et al. | 701/50 |
| 2014/0132382 A1* | 5/2014 | Zarei et al. | 336/61 |
| 2014/0163804 A1* | 6/2014 | Kaneko et al. | 701/22 |

* cited by examiner

ELECTROHYDRAULIC HYBRID WORK VEHICLE

RELATED APPLICATION DATA

This application is the national stage entry of International Appl. No. PCT/IB2012/055608, filed Oct. 15, 2012, which claims priority to Italian Patent Application No. TO2011A000924, filed on Oct. 14, 2011. All claims of priority to these applications are hereby made, and each of these applications is hereby incorporated in its entirety by reference.

TECHNICAL FIELD

The present invention relates to a hybrid work, construction or farm vehicle, such as a lift vehicle with a front or swivel telescopic arm.

BACKGROUND ART

A hybrid vehicle has electric power components, such as motors, alternators, electric actuators and batteries, powered by high-voltage, high-amp alternating or direct current; and a low-voltage/low-amp electric circuit for controlling the electric power components and any other controls or servocontrols.

The high voltage and amperage of the electric power components may interfere with the low-voltage electric circuit signals, thus impairing reliability of the vehicle and, in particular, altering the control signal from the user or the central control unit and so resulting in uncommanded, unpredictable operation of the vehicle Hybrid vehicles at least partly solve the low-efficiency, high-noise problems typical of internal combustion engine work vehicles, including telescopic-arm lift vehicles.

In conventional non-hybrid vehicles, the internal combustion engine must be kept running continuously. To drive the vehicle, which is normally a four-wheel drive, power is transferred from the internal combustion engine to a hydraulic motor; and, to run the hydraulic lift system, power is transferred from the internal combustion engine to a hydraulic pump via a mechanical drive. The internal combustion engine is thus run continuously, to move the vehicle forward and in reverse, as well as to operate the lift system, which is normally controlled by hydraulic actuators operated by the hydraulic pump, in turn operated by the internal combustion engine via a drive.

The above features and drawbacks apply to most work and farm vehicles.

In the case of telescopic-arm vehicles, the telescopic arm is normally controlled by an actuator powered by a hydraulic pump. For layout reasons, as described for example in U.S. Pat. No. 5,707,202, the internal combustion engine is housed in a side compartment between the two vehicle axles, and which houses a number of components, a compressor, a filter, and a hydraulic valve assembly. The vehicle is normally driven by a hydraulic (hydrostatic) motor controlled by the internal combustion engine operated at various speeds by the user. A change in the speed of the internal combustion engine changes the travelling speed of the vehicle and/or generates power/torque to operate the telescopic arm.

In recent years, numerous patent applications have been filed with the object of reducing vehicle consumption and acoustic and pollutant emissions.

Numerous listings relate to hybrid vehicles comprising electric machines.

From a layout standpoint, documented hybrid vehicles can be classified as: series, parallel, and power-split parallel.

Hereinafter, the term 'input' refers to the primary, normally internal combustion (diesel), engine; 'output' to the vehicle drive axles; M/G1 to a first electric motor/generator; and M/G2 to a second electric motor/generator.

In the series solution, the input internal combustion engine is connected mechanically to electric motor/generator M/G1 to produce and supply the batteries with electric power, which is used, when needed, by electric motor/generator M/G2 to drive the output. In which case, the vehicle is driven fully electrically.

In the parallel solution, the input internal combustion engine is connected mechanically by an epicyclic reducer to electric motor/generator M/G1 and to electric motor/generator M/G2 to drive the output. And various mechanical drive layout and control solutions permit combined electric-diesel drive of the vehicle.

The series-parallel (input-split or output-split) hybrid configuration has two main power paths: a mechanical path, along which the power generated by the internal combustion engine is transmitted directly to the wheels; and an electrical path, along which the power generated by the internal combustion engine is first converted to electric power by the generator, and then converted back to mechanical power and transmitted to the wheels or also to any other systems, such as the hydraulic pump, e.g. to operate the telescopic arm.

One example of a hybrid drive with different parallel solutions is described in Patent US2002091028.

US2005061564 describes a parallel, input-split/output-split layout, which has the drawback of being fairly complicated mechanically and in terms of overall vehicle control. Especially in the case of hybrid work vehicles involving high power levels, the hydraulic system, which normally demands more or less the same amount of power as for driving the vehicle, would further complicate the drive, the configuration of which is thus less than optimum.

Because of functional and layout restrictions and the technical choices involved, the known art therefore tends to privilege partial solutions aimed at resolving a specific problem, as opposed to optimizing the vehicle as a whole.

Patent Application EP-A-1914101 describes a hybrid vehicle which, by means of a power splitter, allows part of the power from the diesel engine to be used partly to power the hydraulic system, and partly to charge the batteries by means of a generator; and the power stored in the batteries is given back when needed. There being no clutches, however, the diesel engine has to be kept running continuously.

US20090199553 describes a hybrid excavator, in which the mechanical power generated by the diesel engine is converted by a reversible generator to electric power, which is then used by the same reversible generator to power a hydraulic pump to operate the arm and hydraulic systems. Again, however, there being no clutches, the diesel engine has to be kept running continuously.

JP-A-2005133319 describes a hybrid vehicle operating layout, in which the internal combustion engine and electric motor are located at the rear with the batteries. This is a particularly bulky configuration, which, by raising the centre of gravity, is unsuitable for telescopic-arm vehicles, which, for reasons of stability, have to maintain a low centre of gravity to avoid rolling over. Moreover, no mention is made of the problems involved in assembling individual components to minimize the impact on the layout of a telescopic-arm vehicle.

The hybrid operating solution described allows the internal combustion engine to be run connected to a generator, which powers a battery pack and, from this, an electric motor to drive the vehicle.

More specifically, the internal combustion engine and electric motor are user-controlled directly by first pedal, which controls both the internal combustion engine and the electric motor, and a second pedal, which only controls the electric motor. Which means the user can also act on the speed of the internal combustion engine on the basis of the load demanded of the electric motor, at the expense of the energy efficiency of the vehicle as a whole.

Moreover, unlike other types of vehicles, such as telescopic-arm vehicles, the vehicle described is one of a category of excavators which require more, or at least the same amount of, power to operate the shovel than to drive the vehicle.

This greatly affects the size of hybrid excavator battery packs. In fact, an excavator of the type described in JP-A-2005133319 would need batteries of several hundred kWh to operate one hour with the electric vehicle drive motor and the shovel powered fully electrically, i.e. with the internal combustion engine off. So the batteries would be of such bulk and weight as to be unmountable on the excavator as shown.

The excavator described therefore cannot be run fully electrically to simultaneously drive the vehicle and operate the shovel. On the contrary, the internal combustion engine must be run continuously to simultaneously operate the hydraulic system and drive the vehicle; and the hydraulic system can only be powered electrically when the vehicle is stationary.

The system proposed in JP-A-2005133319 therefore basically amounts to saving power by turning the internal combustion engine off when the vehicle is stationary, and using the power of the batteries and the reversibility of the electric machine to run the hydraulic systems with no emissions and for short periods of time when the vehicle is stationary. No mention is made of the need to balance and control power demand in different vehicle operating conditions, in terms of battery pack sizing and power distribution between vehicle drive and hydraulic system operation.

As stated, the known art thus tends to privilege partial solutions aimed at resolving specific problems, as opposed to achieving an overall solution covering the vehicle as a whole. Another important point to note is the stress future regulations are expected to place on energy-saving and noise-reducing performance.

DISCLOSURE OF INVENTION

The present invention aims at providing an improved configuration by which to convert work and/or telescopic-arm lift vehicles to hybrid, electric-drive vehicles easily and cheaply in terms of component part assembly cost, while at the same time maintaining high performance.

The aims of the present invention are achieved at least by a work vehicle as claimed in claim 1. More specifically, the hybrid assembly according to the invention operates in series to drive the vehicle, and in parallel to operate the hydraulic systems. With this solution, the internal combustion engine, hydraulic pump, and hydraulic pump motor/generator can be housed in the conventional engine compartment of the vehicle, and the electric vehicle drive motor/s can be located according to the architecture of the work vehicle, i.e. with no need for complex, high-cost vehicle gear drives.

Another aim of the present invention is to provide a safer electric power circuit for a hybrid work vehicle.

This aim is achieved by a work vehicle as claimed in claim 1.

BRIEF DESCRIPTION OF THE DRAWINGS

A preferred, non-limiting embodiment of the present invention will be described by way of example with reference to the attached drawings, in which.

BEST MODE FOR CARRYING OUT THE INVENTION

Figure 1:
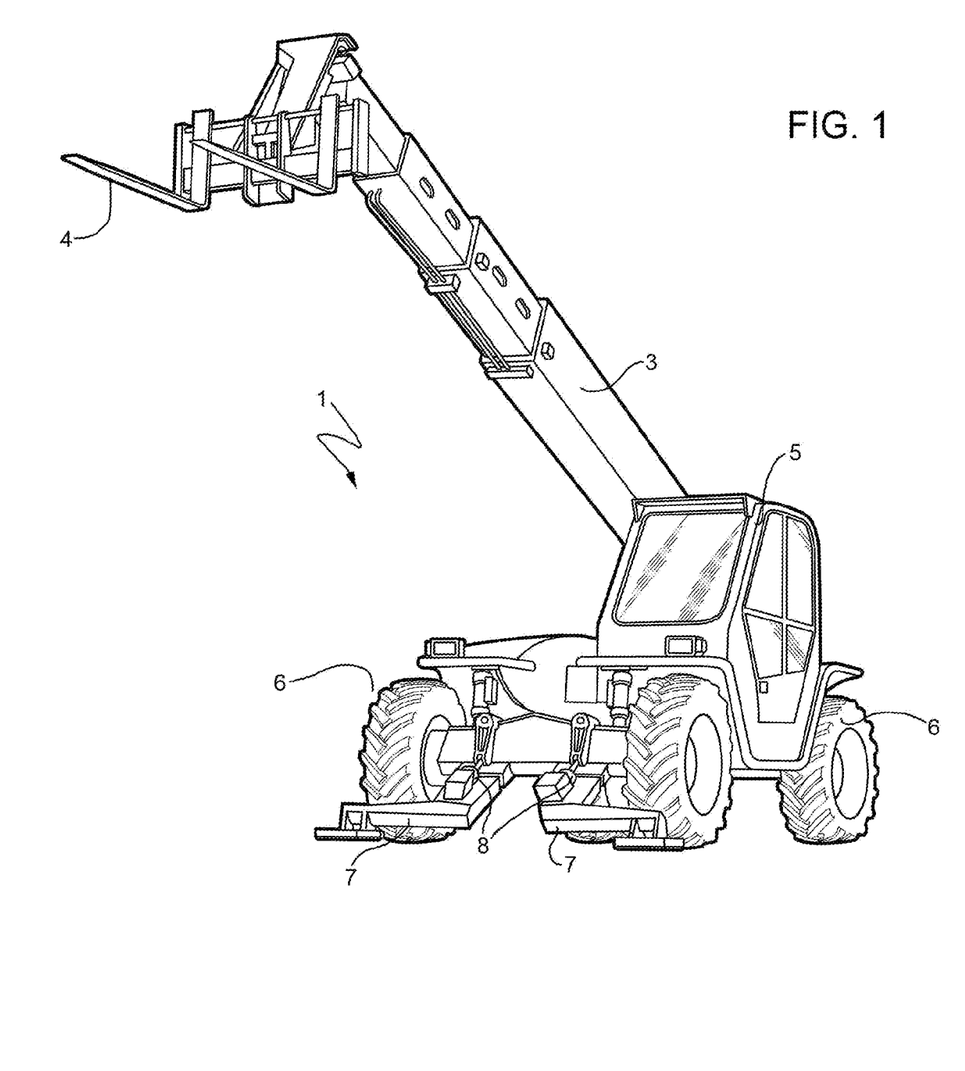
FIG. 1 shows a view in perspective of a lift vehicle in accordance with the present invention.

Number 1 in FIG. 1 indicates as a whole a lift vehicle comprising a frame; a preferably telescopic arm 3 hinged to the frame; a fork 4 fitted to a free end portion of arm 3; a drive cab 5; wheels 6 on two axles; and front and rear stabilizer arms 7 (only the front arms shown in FIG. 1). Front and rear stabilizer arms 7 are operated by respective hydraulic cylinders 8, and are movable between an up position, in which wheels 6 rest on the ground, allowing vehicle 1 to move; and a down position, into which they are lowered by hydraulic cylinders 8 and rest on the ground on plates 9.

Hydraulic cylinders 8 are designed to raise even the fully loaded vehicle 1, and so raise wheels 6 off the ground at the discretion of the operator in cab 5, so arm 3 can be operated with wheels 6 resting on the ground and stabilizer arms 7 in the up position, or with stabilizer arms 7 in the down position and wheels 6 raised.

The lift angle of arm 3 with respect to a plane through the axles of wheels 6 is adjustable, and arm 3 is extendable telescopically. Arm 3 and cab 5 are optionally mounted on a platform, which rotates about an axis perpendicular to the plane containing the axles of wheels 6; and the angle and extension of arm 3 are controlled hydraulically.

Vehicle 1 (FIG. 2) advantageously comprises an internal combustion engine 10; a reversible electric machine 11; a reversible hydraulic machine 12; and a disconnectable drive 13 for connecting engine 10 to reversible electric machine 11 and reversible hydraulic machine 12.

Figure 2:
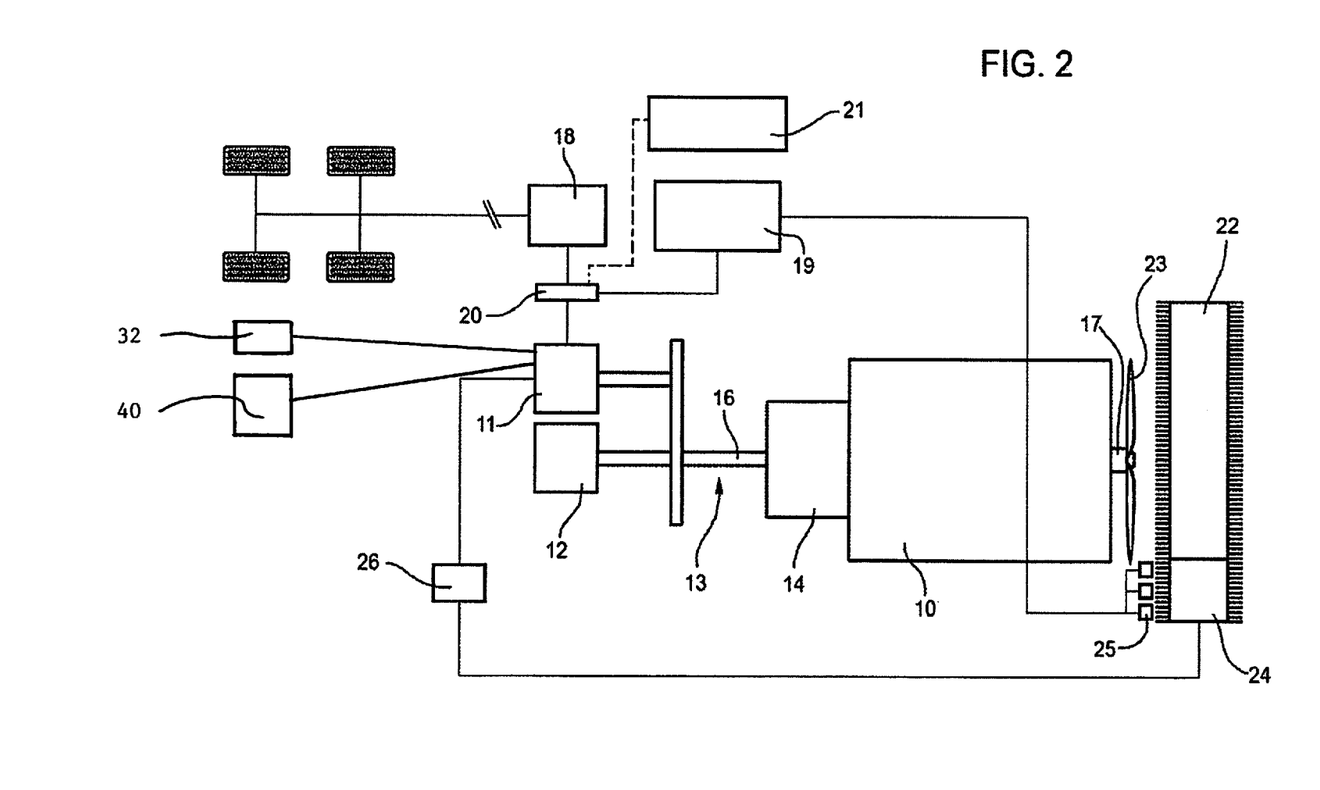
FIG. 2 shows a diagram of the vehicle drive system.
Figure 3:
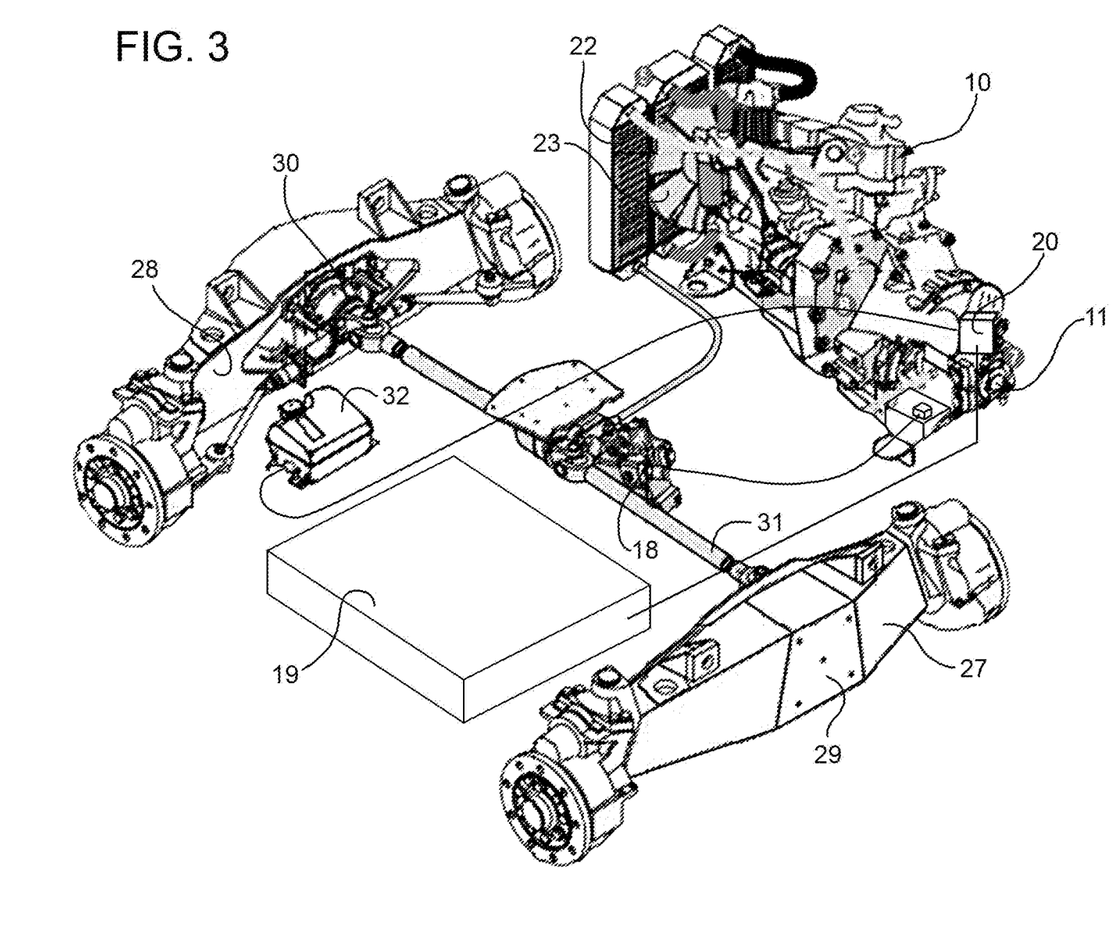
FIG. 3 shows a view in perspective of the FIG. 2 drive system.

More specifically, disconnectable drive 13 comprises a clutch 14, which may be power-controlled by the hydraulic system of the vehicle, or controlled by an electric actuator to permit fully electric operation, even at start-up; and a drive 15 having a shaft 16 connected by clutch 14 to a shaft of engine 10, a shaft connected to reversible hydraulic machine 12, and a shaft connected to reversible electric machine 11. Drive 15 preferably has a fixed ratio, and the transmission ratios, taking shaft 16 as the input shaft, increase the speeds of reversible electric machine 11 and reversible hydraulic machine 12 by a factor greater than one, and preferably differently for machines 11 and 12. For example, reversible electric machine 11 drives reversible hydraulic machine 12 at a lower speed.

Reversible hydraulic machine 12 is connected to all the hydraulic actuators of vehicle 1, e.g. to hydraulic cylinders 8, to a hydraulic cylinder (not shown) for lifting arm 3, to an actuator (not shown) for extending arm 3, to a motor for rotating the platform supporting cab 5 and arm 3, to the gearshift controls, to the brake solenoid valves, and to the tool actuating cylinders.

Vehicle 1 also comprises an electric machine, which, when necessary, operates as an electric motor 18 connected to wheels 6; a battery 19 connected to reversible electric machine 11; and an electric power controller 20 for regulating electric power exchange between battery 19, reversible electric machine 11 and electric motor 18. A central control unit 21 is connected to and controls electric power controller 20 by low-voltage signals to control electric power flow between at least the above three components, to control the various operating stages of the vehicle, and to process signals from control sensors for measuring status or operating parameters, such as the charge of battery 19, the tilt angle and extension of arm 3, etc.

Recent improvements in permanent-magnet electric motor technology have made it possible to obtain electric machines specially designed, in terms of size, power, torque and angular speed, to ensure the necessary performance of different vehicle ranges with greater energy efficiency than that of conventional electric machines.

Recent improvements in technology have also led to the design of highly compact electronic power devices.

Figure 4:
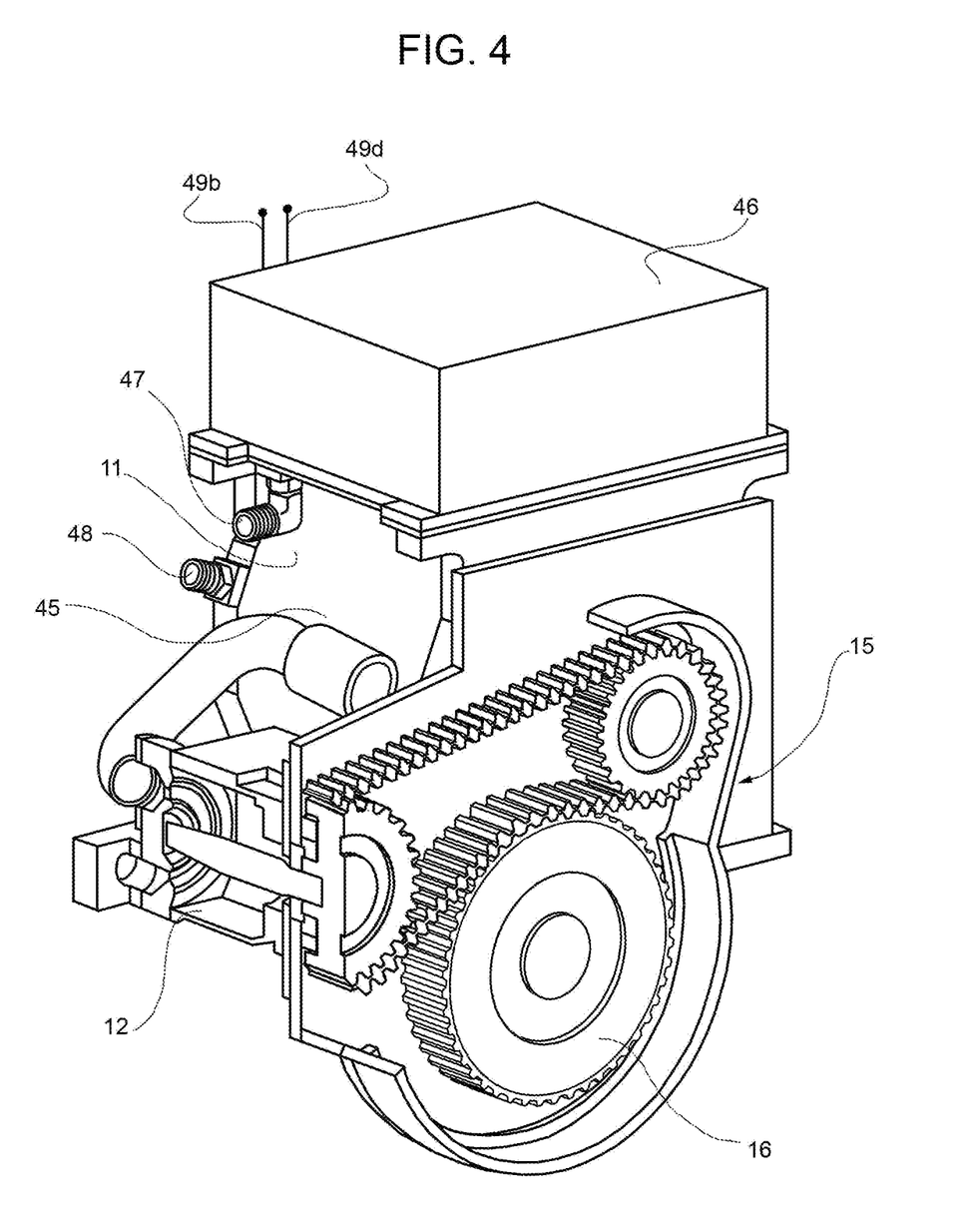
FIGS. 4 and 5 show detailed views in perspective of a vehicle in accordance with the present invention.

More specifically, it has been possible to design a single unit comprising reversible electric machine 11, reversible hydraulic machine 12, an electric actuator 40 for operating reversible electric machine 11, and capacitors 41 (FIG. 4). Electric actuator 40 comprises an inverter and a control board for controlling speed when machine 11 operates as a motor, and for controlling the electric power generated when machine 11 operates as a generator; and a terminal (not shown) connected to reversible electric machine 11 and supplied with alternating power voltage and current.

Similarly, it has been possible to design an electric motor 18 in the permanent-magnet category, e.g. in the 30-150 kW power range, and an electric actuator 42 of like diameter, so that the electric actuator 42 is smaller axially than motor 18 (FIG. 5) and can be mounted contacting a flat wall 33 of electric motor 18 to improve the configuration of the cooling circuit as explained below. Electric actuator 42 preferably also comprises an inverter and a control board for controlling speed when machine 11 operates as a motor, and for controlling the electric power generated when machine 11 operates as a generator; and a terminal M similar to that of electric actuator 40, connected to reversible electric machine 11, and supplied with alternating power voltage and current.

A cooling system of vehicle 1 comprises a mechanical fan; a fan operated electrically by central control unit 21; a hydraulic circuit for cooling internal combustion engine 10 with a radiator; and a hydraulic circuit for cooling the electric power devices, i.e. reversible electric machine 11, electric motor 18, electric power controller 20, electric actuators 40, 42, and capacitors 41. More specifically, the internal combustion engine hydraulic cooling circuit comprises a radiator 22 cooled by a fan 23 connected mechanically, e.g. directly, to the crankshaft 17, on the opposite side to clutch 14.

The electric component cooling circuit has its own radiator 24, and a number of electric fans 25 powered at least occasionally by battery 19. The two cooling circuits are preferably separate, and electric fans 25 and radiator 24 are designed to cool the heat generated in design conditions by reversible electric machine 11, electric motor 18, and electric power controller 20. Radiators 22 and 24 are advantageously positioned adjacent to each other and facing fan 23, which is designed to cool the coolant of both the engine 10 and electric power device cooling circuits. In one embodiment of the invention, electric fans 25 are interposed between radiator 24 and fan 23 for greater compactness.

The electric component cooling circuit comprises an electric pump 26 controlled by central control unit 21 and which may be powered by battery 19.

According to the present invention, the electric power components in need of cooling are arranged to improve the efficiency of the cooling circuit.

More specifically (FIG. 4), coolant flow along the circuit successively cools electric actuator 40, electric power controller 20, capacitors 41, and reversible electric machine 11. This provides for effectively cooling reversible electric machine 11, which needs more cooling power than electric actuator 40, capacitors 41 and electric power controller 20.

Figure 5:
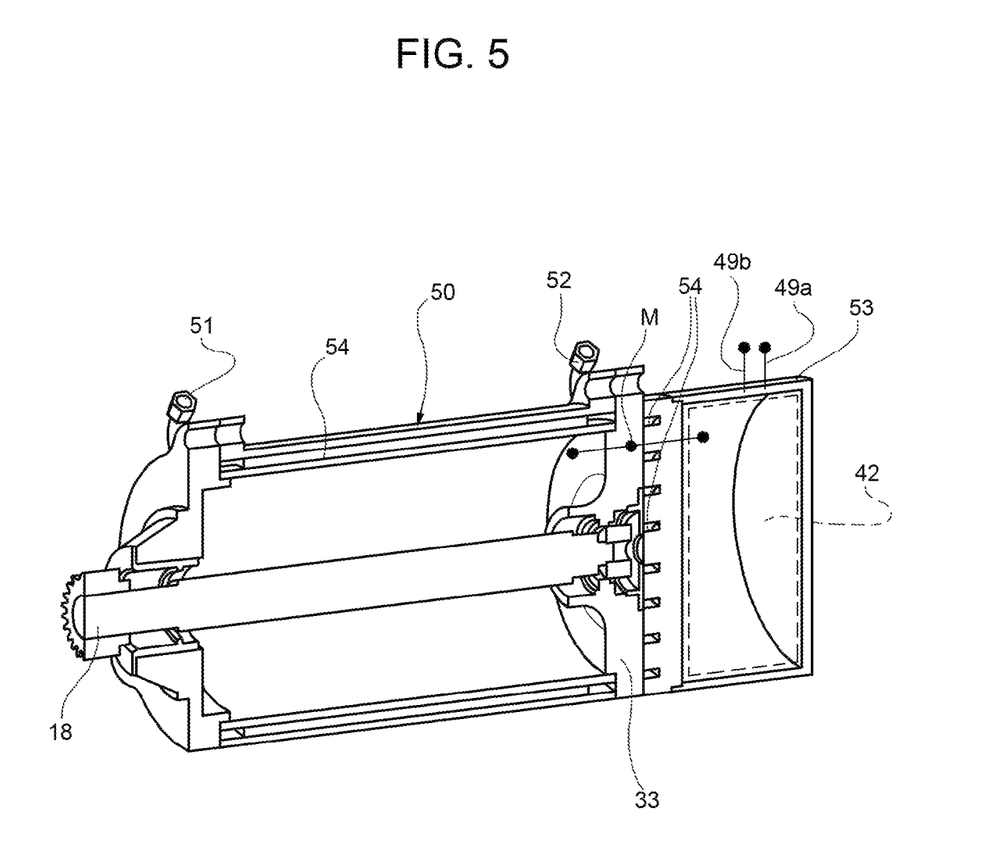

The above components are preferably housed in fluidtight casings defining coolant inlet and outlet ports. The casings thus protect the electric components from liquid or atmospheric agents and at the same time form part of the cooling circuit, and may either house the electric components or be integrated in them as shown in FIG. 5.

A first casing 45 advantageously houses reversible electric machine 11, and a second casing 46 houses other electric power devices such as electric actuator 40, capacitors 41, and electric power controller 20. Each casing 45, 46 defines coolant ports, only two of which, an inlet port 47 and an outlet port 48, are shown. Together or individually, casings 45, 46 define respective branches of the electric component cooling circuit supplied by electric pump 26, and are preferably two portions of a single block forming a protective shell sealing the above electric and electronic components from the outside environment.

According to one aspect of the present invention, electric alternating or direct current power terminals between reversible electric machine 11, electric actuator 40, electric power controller 20 and capacitors 41 are located inside casings 45, 46, and, as opposed to fast-fit connectors, comprise, for example, screw connectors for safe protection against vibration and contaminants such as water, dust, etc. More specifically, at least the alternating current power terminal between actuator 40 and reversible electric machine 11 is located inside the block formed by casings 45, 46, which comprises an electric terminal 49a for transmitting electric power to battery 19 and electric motor 18, comprises an electric terminal 49b for a low-voltage, e.g. 12-24 V, electric signal, and is interfaced outwards by terminals 49 not powered by high-amp alternating current.

The high-voltage direct-current bus is advantageously not grounded, for greater safety against electric shock.

Similarly (FIG. 5), a rotor of electric motor 18 is housed in a casing 50 defining coolant inlet and outlet ports 51, 52. Electric actuator 42, shown by the dash line in FIG. 5, is mounted contacting wall 33 of casing 50, and is protected by a casing 53 which closes onto wall 33. Electric terminal M is preferably housed inside casings 50 and 53 combined, for protection against atmospheric agents, and, like the electric terminal configuration of the casing 45 and 46 block, as opposed to being a fast-fit, e.g. Faston, type, is a screw type to better withstand vibration which could disconnect terminal M and so cut off the electric power line between electric actuator 42 and electric motor 18.

One or more walls of at least one of casing 45, 46, 50, 53 may define coolant flow channels 54 connected fluidically to radiator 24. Together or individually, casings 50, 53 also define branches of the cooling circuit supplied by electric pump 26.

The FIG. 4 unit and electric motor 18 with electric actuator 42 are connected fluidically in series or parallel with respect to electric pump 26.

Vehicle 1 also comprises a low-voltage 12/24 V converter to operate, in addition to electric pump 26, the whole electric network of the sensors and hydraulic circuit control solenoid valves whose I/O signals are controlled by central control unit 21.

The high-voltage bus is also high-amp, e.g. 500 V, 150 A, to connect battery 19, the FIG. 4 unit, and the unit defined by electric actuator 42 and electric motor 18.

Capacitors 41 guarantee the necessary power to meet peak power demand by the driven devices, and to regulate power demand from the battery.

In a preferred embodiment of the invention, at least engine 10, fan 23, electric fans 25, radiators 22, 24, disconnectable drive 13, reversible electric machine 11, and reversible hydraulic machine 12 are housed in one side compartment of vehicle 1, between front and rear wheels 6.

The frame comprises a front axle 27 and a rear axle 28 with respective differentials 29, 30; and a constant-velocity, double-universal-joint drive 31 connecting differentials 29 and 30. Electric motor 18 is connected to constant-velocity, double-universal-joint drive 31, preferably by an at least two-ratio transmission, and preferably in a compartment between arm 3 and constant-velocity, double-universal-joint drive 31. Battery 19 is fitted to the frame inside another side compartment between front and rear axles 27, 28, i.e. on the opposite side of constant-velocity, double-universal-joint drive 31 to engine 10. And each axle comprises a wheel reducer in the hub (not shown) for reducing speed from differential 29, 30 to the respective pair of wheels 6.

Vehicle 1 operates as follows:

Engine 10 is connected to electric motor 18 to form a series hybrid drive, i.e. the vehicle is driven solely by electric motor 18, and engine 10 controls reversible hydraulic machine 12 and/or charges the battery via reversible electric machine 11, and powers fan 23 when it is running. Vehicle speed is thus controlled electrically; and an accelerator pedal 32, which serves as a user interface, is preferably connected to a potentiometer, which sends a signal to central control unit 21. This is programmed to turn internal combustion engine 10 on or off automatically on the basis of a number of operating parameters comprising, for example, the charge of battery 19 and/or the torque and/or power demand of reversible hydraulic machine 12 and/or the power demand of fans 25, 23 and/or the power demand of electric motor 18. Accelerator pedal 32 controls electric motor 18 directly to adjust vehicle speed between zero and maximum speed. Using an electric motor reverse lever, the vehicle can be reversed smoothly with no need for a clutch or mechanical transmission, and the forward/reverse speed of the vehicle is adjusted using accelerator pedal 32, with no change in the speed of internal combustion engine 10.

Internal combustion engine 10 can operate in a discrete number of operating modes, i.e. at a number of fixed points, stored and selected by central control unit 21 to supply maximum power at low engine speed and low consumption, even when vehicle 1 demands maximum drive speed or torque. These discrete operating modes are preferably mapped in central control unit 21, and are selected automatically by the central control unit on the basis of user power demand, as determined from the controls operated by the user, e.g. accelerator pedal 32 and/or the hydraulic user device controls for controlling, singly or jointly, hydraulic cylinders 8, the brake system, the cab 5 and arm 3 rotation system, and the arm 3 extension and/or angle control system.

For example, the power generated by internal combustion engine 10 is supplied to reversible electric machine 11 and directly along the high-voltage direct-current bus to electric motor 18. Any extra start-up power demand is supplied by battery 19 and/or capacitors 41.

By means of power controller 20, the power delivery control system optimizes the speed/power/consumption performance of the engine at various points on the characteristic curve of internal combustion engine 10 to achieve the necessary power combined with low consumption.

Besides operating as a generator when internal combustion engine 10 is on, reversible electric machine 11 can also operate as a motor off battery 19 to run reversible hydraulic machine 12 when engine 10 is off and clutch 14 is released. In this operating mode, too, accelerator pedal 32 is the only control the user needs operate to move vehicle 1 forward and in reverse by means of the lever referred to above.

In fully electric mode, battery 19 also powers electric fans 25 to control the temperature of reversible electric machine 11 and electric motor 18. Cab 5 may be equipped, for example, with a selector 60 for selecting another operating mode, in which internal combustion engine 10 is off, and, when the charge of battery 19 falls below a given threshold, central control unit 21 keeps engine 10 off and issues a user signal, e.g. acoustic and/or visual, by means of an indicator 61. The charge threshold is selected to allow vehicle 1 a sufficient operating range to reach a current outlet and charge battery 19, or to allow the user to move to an area in which internal combustion engine 10 can be turned on. In this operating mode, internal combustion engine 10 is turned on manually by the user, as opposed to automatically, and this is a useful mode when operating the vehicle with internal combustion engine 10 off, e.g. in closed environments housing animals.

Electric motor 18 may also be a reversible electric machine and so permit power regeneration when braking, even when vehicle 1 is in fully electric mode, clutch 14 is released, and reversible electric machine 11 necessarily operates as a motor to power reversible hydraulic machine 12.

For vehicle 1 to operate effectively in fully electric mode, the design, in terms of power, of battery 19, electric motor 18, reversible hydraulic machine 12 and reversible electric machine 11 is particularly important, to enable vehicle 1 to operate a sufficient length of time in fully electric mode with internal combustion engine 10 off, i.e. to drive the vehicle and simultaneously operate the lift systems electrically, when operating, for example, in closed environments with zero emissions.

Electric power controller 20 comprises an electric socket for connection to an external electric power source from which to charge battery 19 and power electric motor 18. By means of a voltage converter, various 220 and/or 400 V onboard user device power outlets are also available, battery 19 being of the same or higher voltage, e.g. 700 V. The telescopic arm may thus be fitted with a platform equipped with one such 12 and/or 24 and/or 220 and/or 400 V outlet from which to power hand tools on the platform.

By means of a sensor connected to central control unit 21, reversible electric machine 11 may advantageously operate as a motor and receive the hydraulic fluid of the linear actuators which pump fluid when arm 3 is lowered and/or withdrawn telescopically. The weight of arm 3 and possibly of the load on the arm may in fact control reversible hydraulic machine 12 to control reversible electric machine 11 and generate electric power.

Vehicle 1 has the following advantages:

The vehicle according to the invention is wired with a high-voltage direct-current bus connecting the electric power devices located at various points on the frame, and which therefore does not interfere with the low-voltage electric controls, thus safeguarding all the electric controls on-board the vehicle. Housing the high-voltage alternating-current terminals M and relative cables in compact sealed casings conforms with even the strictest safety standards relating to atmospheric agents and vibration, by allowing use of non-fast-fit electric connectors. Moreover, the casings are connected to one another into blocks, each with one external direct-current power terminal 49a connected to the direct-current bus.

Driving the vehicle is user-controlled easily by accelerator pedal 32 interacting with central control unit 21, which is programmed to turn internal combustion engine 10 on and off on the basis of the charge of battery 19, even while electric motor 18 is running. More specifically, central control unit 21 controls internal combustion engine 10 to operate in a discrete number of fixed, highly energy-efficient points to minimize transients and reduce consumption.

The electric power components are arranged to improve heat exchange with the cooling circuit.

At least reversible electric machine 11 and electric motor 18 are housed in respective substantially sealed casings to prevent damage to the electric components by atmospheric agents and allow operation of vehicle 1 even in damp or water-logged conditions.

The casings also advantageously form part of the cooling circuit by allowing coolant flow inside.

The electric power components (at least electric motor 18, reversible electric machine 11, battery 19 and capacitors 41) and the mechanical power components (at least reversible hydraulic machine 12 and internal combustion engine 10) are designed to permit simultaneous operation of telescopic arm 3 and electric motor 18, to allow vehicle 1 to operate cleanly in closed environments, or in work environments such as industrial and agricultural warehouses and tunnels.

Clearly, changes may be made to vehicle 1 as described and illustrated herein without, however, departing from the protective scope of the accompanying Claims.

For example, a retrofit kit for existing vehicles may be provided comprising the lower-power internal combustion engine 10, reversible electric machine 11, drive 13, electric motor 18, battery 19, electric power controller 20, central control unit 21, and the potentiometer for accelerator pedal 32.

The 3/4/5 assembly may be rotatable by disconnecting the bottom of the frame with a swivel for rotating cab 5 and arm 3 with respect to the frame with the engine, motor and drive housings. The swivel may be operated conventionally, by a hydraulic system in parallel with the circuit powered by reversible electric machine 12, or by an additional electric motor.

Battery 19 may be a high-performance, i.e. lithium or lithium polymer, type, or a conventional lead acid or lead gel battery.

Alternatively, the blocks of each reversible electric machine may comprise a number of sealed casings connected electrically to one another by alternating-current power cables, short sections of which are outside the sealed casings. In this case, however, the alternating-current cables are short—less than 50 cm in length—and are at least partly protected by placing the sealed casings close together and possibly connecting them mechanically to one another.

Electric motor 18 for driving the vehicle may be constructed as a complex assembly in the form of a number of local units mounted directly between the frame of vehicle 1 and the relative rims of wheels 6. In which case, the direct-current power bus conducts power from battery 19 to each wheel drive unit and vice versa, and each wheel drive unit comprises a sealed outer casing for protection against moisture or water; and a respective stator, rotor and direct-current electric actuator 42 inside the casing. The wheel drive unit also comprises an electric power component cooling circuit comprising at least one inlet and one outlet port accessible from the outside the casing for connection to electric pump 26 of vehicle 1. Each wheel drive unit is connected to relative wheel 6—i.e. the pair of wheels on the same axle have two respective wheel drive units—either directly or with the interposition of a mechanical transmission.

The invention claimed is:

1. A work vehicle (1) comprising an internal combustion engine (10); a first electric machine (18) for driving the vehicle; at least one hydraulic circuit comprising a number of hydraulic actuators (7, 8) and a hydraulic machine (12) for operating at least said hydraulic actuators (8); a second electric machine (11) which is reversible; a battery (19) rechargeable by said second electric machine (11) to permit operation of said first electric machine (18), and said second electric machine (11) also being operable off of said battery (19) to control said hydraulic machine (12); a drive (15) for connecting said internal combustion engine (10) mechanically to said second electric machine (11) and to said hydraulic machine (12), so said second electric machine and said hydraulic machine are in parallel with respect to said internal combustion engine (10); and a clutch (14) for disconnecting said internal combustion engine (10) from said drive (15) to allow said second electric machine (11) to selectively power said hydraulic machine (12) when said internal combustion engine (10) is disconnected from said drive (15); said vehicle also comprising:

a first electric actuator (40) integrated in a first block (45, 46) with said second electric machine (11);

a second electric actuator (42) integrated in a second block (50) with said first electric machine (18); and an electric power controller (20) for controlling electric power exchange between said first and second electric actuator (40, 42) and said battery (19);

said electric power controller (20), said first and second electric actuator (40, 42) and said battery (19) being connected by direct-current electric lines; and said vehicle characterized by comprising an interface (32) designed to transmit a user input signal to a central control unit (21) connected to said electric power controller (20) to at least control the drive speed of said vehicle by said first electric machine (18) on the basis of said input signal; and in that said central control unit (21) is programmed to select a first operating mode, in which, when the charge of said battery (19) falls below a predetermined threshold, said internal combustion engine (10) is turned on automatically when said hydraulic machine (12) is activated, independently of operation of said first electric machine (18) and said second electric machine (11).

2. A vehicle as claimed in claim 1, characterized in that said central control unit (21) is programmed to permit user selection of a second operating mode, in which said internal combustion engine (10) is turned off and said second electric machine (11) and/or said first electric machine (18) are powered by said battery (19), wherein, in said second operating mode, said internal combustion engine (10) is configured to be turned on solely manually by a user.

3. A vehicle as claimed in claim 1, characterized in that said drive (15) provides a mechanical connection when said internal combustion engine (10) drives said second electric machine (11) and/or said hydraulic machine (12).

4. A vehicle as claimed in claim 1, characterized in that said hydraulic machine (12) is reversible and is configured to drive said second electric machine (11) when hydraulic fluid is pumped by at least one of said hydraulic actuators connected to an arm (3).

5. A vehicle as claimed in claim 1, characterized in that said first electric machine (18) is reversible; and a central control unit (21) is programmed to supply the power generated by said first electric machine (18) to said battery (19).

6. A vehicle as claimed in claim 1, characterized in that said battery (19) and an assembly, comprising at least said second electric machine (11), said hydraulic machine (12), said drive (15), said clutch (14) and said first electric actuator (40), are housed in respective opposite side compartments of said vehicle.

7. A vehicle as claimed in foregoing claim 1, characterized in that said first electric machine (18) comprises at least one wheel drive unit connected to a respective wheel (6) of said vehicle.

8. A work vehicle (1) comprising an internal combustion engine (10); a first electric machine (18) for driving the vehicle; at least one hydraulic circuit comprising a number of hydraulic actuators (7, 8) and a hydraulic machine (12) for operating at least said hydraulic actuators (8); a second electric machine (11) which is reversible; a battery (19) rechargeable by said second electric machine (11) to permit operation of said first electric machine (18), and said second electric machine (11) also being operable off of said battery (19) to control said hydraulic machine (12); a drive (15) for connecting said internal combustion engine (10) mechanically to said second electric machine (11) and to said hydraulic machine (12), so said second electric machine and said hydraulic machine are in parallel with respect to said internal combustion engine (10); and a clutch (14) for disconnecting said internal combustion engine (10) from said drive (15) to allow said second electric machine (11) to selectively power said hydraulic machine (12) when said internal combustion engine (10) is disconnected from said drive (15); said vehicle also comprising:
- a first electric actuator (40) integrated in a first block (45, 46) with said second electric machine (11);
- a second electric actuator (42) integrated in a second block (50) with said first electric machine (18); and
- an electric power controller (20) for controlling electric power exchange between said first and second electric actuator (40, 42) and said battery (19);
- said electric power controller (20), said first and second electric actuator (40, 42) and said battery (19) being connected by direct-current electric lines; and
- said vehicle characterized by comprising at least one sealed casing (45, 46; 50, 53) for housing and protecting against atmospheric agents at least one of the following electric power devices: said second electric machine (11), said first electric machine (18), said electric power controller (20), and said first and second electric actuator (40, 42); and
- further characterized in that said at least one sealed casing (45, 46; 50, 53) has a power current first electric terminal (49a) connected to at least one of said direct-current lines; and a low-voltage second electric terminal (49b) connected to said at least one electric power device.

9. A vehicle as claimed in claim 8, characterized by comprising at least one further electric terminal (M) for alternating power current; and in that said further electric terminal (M) is located inside said at least one sealed casing (50, 53).

10. A vehicle as claimed in claim 8, characterized in that said drive (15) provides a mechanical connection when said internal combustion engine (10) drives said second electric machine (11) and/or said hydraulic machine (12).

11. A vehicle as claimed in claim 8, characterized in that said hydraulic machine (12) is reversible and is configured to drive said second electric machine (11) when hydraulic fluid is pumped by at least one of said hydraulic actuators connected to an arm (3).

12. A vehicle as claimed in claim 8, characterized in that said first electric machine (18) is reversible; and a central control unit (21) is programmed to supply the power generated by said first electric machine (18) to said battery (19).

13. A vehicle as claimed in claim 8, characterized in that said battery (19) and an assembly, comprising at least said second electric machine (11), said hydraulic machine (12), said drive (15), said clutch (14) and said first electric actuator (40), are housed in respective opposite side compartments of said vehicle.

14. A vehicle as claimed in foregoing claim 8, characterized in that said first electric machine (18) comprises at least one wheel drive unit connected to a respective wheel (6) of said vehicle.

15. A work vehicle (1) comprising an internal combustion engine (10); a first electric machine (18) for driving the vehicle; at least one hydraulic circuit comprising a number of hydraulic actuators (7, 8) and a hydraulic machine (12) for operating at least said hydraulic actuators (8); a second electric machine (11) which is reversible; a battery (19) rechargeable by said second electric machine (11) to permit operation of said first electric machine (18), and said second electric machine (11) also being operable off of said battery (19) to control said hydraulic machine (12); a drive (15) for connecting said internal combustion engine (10) mechanically to said second electric machine (11) and to said hydraulic machine (12), so said second electric machine and said hydraulic machine are in parallel with respect to said internal combustion engine (10); and a clutch (14) for disconnecting said internal combustion engine (10) from said drive (15) to allow said second electric machine (11) to selectively power said hydraulic machine (12) when said internal combustion engine (10) is disconnected from said drive (15); said vehicle also comprising:
- a first electric actuator (40) integrated in a first block (45, 46) with said second electric machine (11);
- a second electric actuator (42) integrated in a second block (50) with said first electric machine (18); and
- an electric power controller (20) for controlling electric power exchange between said first and second electric actuator (40, 42) and said battery (19);
- said electric power controller (20), said first and second electric actuator (40, 42) and said battery (19) being connected by direct-current electric lines; and
- said vehicle characterized by comprising a cooling circuit for cooling at least one of said second electric machine (11), said first electric machine (18), and a further electric power device (20, 40, 42);
- said cooling circuit having a branch (45, 46, 50, 53) comprising an inlet port (47, 51) and an outlet port (48, 52); and
- said at least one of said second electric machine (11) and said first electric machine (18) being located downstream from said further electric power device (20, 40, 42) with respect to said inlet and outlet ports (47, 48);
- said further electric power device being selected from the group comprising said electric actuator and said electric power controller.

16. A vehicle as claimed in claim 15, characterized by comprising at least one sealed casing (45, 46; 50, 53) for housing and protecting against atmospheric agents at least one of the following electric power devices: said second electric machine (11), said first electric machine (18), said electric power controller (20), and said first and second electric actuator (40, 42) and in that said branch comprises said sealed casing (45, 46, 50, 53).

17. A vehicle as claimed in claim 15, characterized in that said drive (15) provides a mechanical connection when said internal combustion engine (10) drives said second electric machine (11) and/or said hydraulic machine (12).

18. A vehicle as claimed in claim 15, characterized in that said hydraulic machine (12) is reversible and is configured to drive said second electric machine (11) when hydraulic fluid is pumped by at least one of said hydraulic actuators connected to an arm (3).

\* \* \* \* \*